United States Patent [19]

Cooper et al.

[11] 3,991,334

[45] Nov. 9, 1976

[54] END WINDING RESTRAINT ASSEMBLY FOR TURBINE GENERATORS

[75] Inventors: Glenn D. Cooper, Irwin; Robert M. Colangelo, Pittsburgh, both of Pa.

[73] Assignee: Westinghouse Electric Corporation, Pittsburgh, Pa.

[22] Filed: Jan. 23, 1975

[21] Appl. No.: 543,379

[52] U.S. Cl. .............................. 310/260; 310/194
[51] Int. Cl.² ......................................... H02K 3/46
[58] Field of Search ............ 310/194, 91, 214, 215, 310/260, 270, 271, 42; 336/185, 208

[56] References Cited
UNITED STATES PATENTS

| | | | |
|---|---|---|---|
| 971,820 | 10/1910 | Behrend | 310/260 |
| 1,238,280 | 8/1917 | Field | 310/260 |
| 3,075,103 | 1/1963 | Ward | 310/260 |
| 3,344,296 | 9/1967 | Coggeshall | 310/271 |
| 3,649,860 | 3/1972 | Richardson | 310/260 |

FOREIGN PATENTS OR APPLICATIONS

| | | | |
|---|---|---|---|
| 1,197,971 | 8/1965 | Germany | 310/260 |
| 413,073 | 5/1966 | Switzerland | 310/260 |

*Primary Examiner*—R. Skudy
*Attorney, Agent, or Firm*—C. L. McHale

[57] ABSTRACT

End winding conductors are attached to bracing rings which are connected to a plurality of support brackets positioned around the outside of the conductors. The support brackets are attached to a ring-shaped member which has its radial movement restrained by a plurality of blocks which are positioned around the outside of the ring-shaped member. The blocks are adjustably attached to another ring which is fixed to the stator iron core. Springs are positioned between the ring-shaped member and the stator iron core to provide an axial load on the support brackets. Conductor movement due to thermal changes is prevented in the radial direction but permitted in the axial direction due to the axial movement of the ring-shaped member with respect to the blocks.

7 Claims, 2 Drawing Figures

END WINDING RESTRAINT ASSEMBLY FOR TURBINE GENERATORS

BACKGROUND OF THE INVENTION

1. Field of the Invention

This invention relates, in general, to electromechanical apparatus and, more specifically, to end winding restraint assemblies for turbine generators.

2. Description of the Prior Art

Restraint or bracing structures are used to secure the end winding conductors of turbine generators and to limit their movement or vibration due to normal and overload current conditions. Conventional bracing structures have used nonmetallic brackets rigidly connected to the core support plate or end shield. The bracing rings and the winding conductors are secured to the brackets, usually by an arrangement of glass roping around the conductors. When the temperature of the stator iron core increases, the thermal expansion pattern of the brackets tends to deflect the brackets outwardly and away from the end winding conductors. The resulting looseness between the brackets and the conductors, even when very minute, detrimentally affects the ability of the machine to withstand the large forces encountered under overload current conditions and the constant forces encountered under normal current conditions without damage to the machine.

The thermal expansion pattern of the conductors also causes the conductors to expand axially away from the stator iron core as the temperature increases. This movement also tends to increase the distance between the conductors and the brackets due to the conical configuration of the end winding conductors. Thus, the integrity of the bracing arrangement is degraded due to the movement of the conductors relative to the supporting brackets.

In addition to the above mentioned temperature responsive movements, it has been found that it is difficult to maintain the dimensions of the end shield or support plate within the tolerances necessary to properly hold the brackets in the desired location. Therefore, it is desirable, and it is an object of this invention, to provide an end winding restraint assembly for turbine generators which does not loose its ability to tightly hold the end winding conductors in place due to temperature and dimensional instability.

SUMMARY OF THE INVENTION

There is disclosed herein a new and useful end winding conductor securing arrangement which does not result in a loose end winding conductor assembly from dimensional changes due to temperature variations and to manufacturing tolerances. The end winding conductors and the support rings are attached to a non-metallic bracket which is rigidly connected to a ring-shaped member. The ring-shaped member is positioned around the outside of the conductor supporting brackets and is located within a circular area defined by a plurality of adjustable blocks. These blocks are connected by a jack screw to a ring which is rigidly fixed to the stator iron core. The blocks restrain the radial movement of the ring-shaped member while permitting the axial movement thereof. A material having a low coefficient of friction may be positioned between the block and of the ring-shaped member to facilitate axial movement of the end winding conductor assembly as a result of the thermal expansion. Compressed springs are located between the ring-shaped member and the stator iron core to produce an axial force acting on the support brackets which spring loads the assembly to maintain tightness under all expected temperature conditions.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
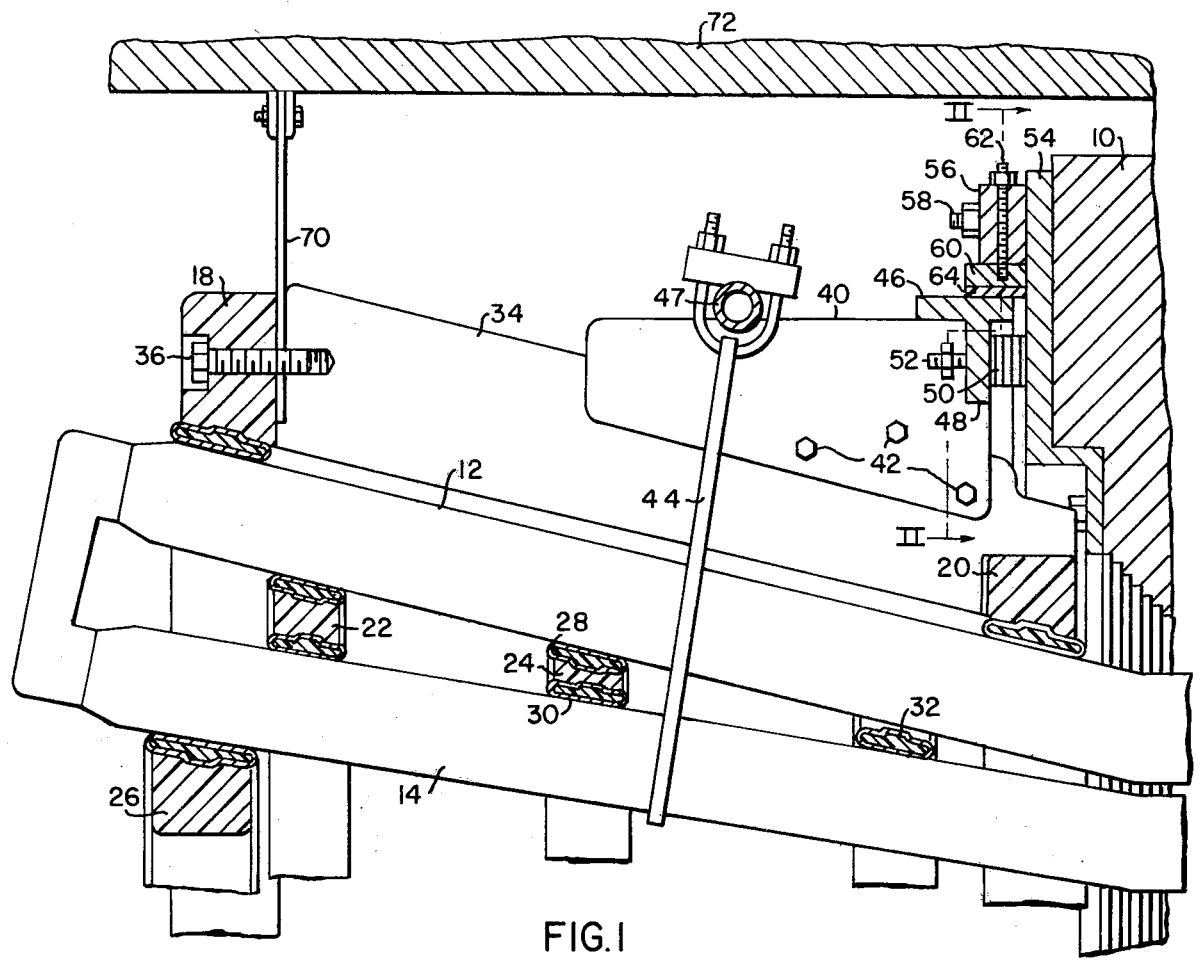
FIG. 1 is a partial, cross-sectional side view of a turbine generator constructed according to this invention.

Throughout the following description, similar reference characters refer to similar elements or members in all of the figures of the drawing.

Referring now to the drawing, and to FIG. 1 in particular, there is shown a partial, cross-sectional side view of a turbine generator constructed according to this invention. The generator includes the stator iron core 10, the bottom end winding conductor 12, and the top end winding conductor 14. The conductors 12 and 14 are extensions of the stator winding assembly which is disposed in slots in the stator iron core 10. Normally, the end winding conductors 12 and 14 do not extend parallel to each other from the stator iron core 10. The connection 16 represents the interconnecting lead which connects together appropriate end winding conductors. Although illustrated differently in FIG. 1 for simplicity, the end winding connections usually do not connect together the same conductors which extend from the same stator iron core slot.

The conductors 12 and 14 are tightly held together by the action of the bracing rings 18, 20, 22, 24 and 26 which extend around and between the conductors 12 and 14. The bracing rings may be constructed of a suitable nonmetallic material, such as a glass filament reinforced epoxy resin. In the specific embodiment, the rings are tightly held to the conductors 12 and 14 by flexible hoses which have been filled, under pressure, with an epoxy resin which is cured to a solid state. The hoses 28 and 30 associated with the ring 24 are typical. The hoses associated with the rings 18, 20 and 26 force the conductors 12 and 14 together, while the hoses associated with the rings 22 and 24, and the hose 32, tend to force the conductors 12 and 14 away from each other. Thus, the conductors 12 and 14 are tightly wedged between the various bracing rings and their movement with respect to each other is substantially restricted. It is emphasized that various other arrangements may be used to secure the conductors 12 and 14 to each other and to other conductors in the end winding conductor assembly of the turbine generator without departing from the scope of the invention disclosed herein.

The ring 18 is attached to the bracket 34 by a suitable fastening element, such as the bolt 36. Substantially similar means may be used to fasten the ring 20 to the bracket 34 or, as shown in FIG. 1, the ring 20 may be positioned in a slot in the bracket 34, thereby restricting movement of the ring 20 in a radial direction away from the conductors 12 and 14 and in an axial direction away from the stator iron core 10.

The bracket 34 may be constructed of any suitable material, preferably a non-metallic material such as glass reinforced epoxy resin. The bracket 34 is located between a pair of plates 40 and is attached thereto by the bolts 42. The entire end winding conductor assembly is secured firmly to the plates 40 and to the bracket 34 by the band 44 which tightly pulls the end winding conductor assembly toward the circular tube 47 which extends around the outside of the plates 40 for the entire circumference of the generator. Thus, the conductors 12 and 14, the various end rings, and the bracket 34, together with the mounting plates 40, are tightly bound together and move together due to any normal expansion characteristics of the generator members.

The plates 40 are connected to the ring-shaped or circular member 46 by a suitable means, such as by the weld fillets 48. The member 46 extends around the circumference of the generator and completely encircles the longitudinal axis of the stator winding of the generator. Thus, all of the brackets of the generator and all of the mounting plates attached to the various brackets are rigidly connected to the member 46. The member 46 is forced in an axial direction away from the stator iron core by the springs 50 which are initially compressed during construction of the generator by tightening of the bolts 52. After the generator has been assembled sufficiently, the bolt 52 is loosened to allow the compressed spring 50 to provide a force upon the member 46 which constantly tends to move the member 46 away from the stator iron core 10 and from the end core support plate 54. The springs 50 may consist of any suitable spring construction, such as coil springs or washer springs.

Figure 2:
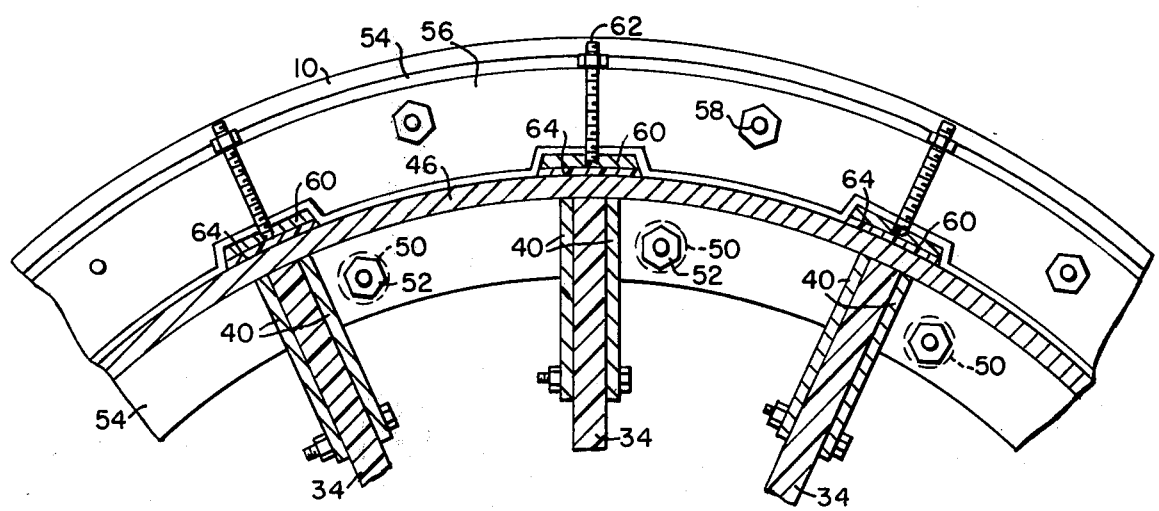
FIG. 2 is a partial, cross-sectional end view of the turbine generator illustrated in FIG. 1.

FIG. 2 is a partial view of the end of the turbine generator shown in FIG. 1 illustrating, from another angle, the elements used to restrain the movement of the member 46. The description of the elements may be better understood by referring to both FIGS. 1 and 2. A circular ring 56 is attached to the core support plate 54 and to the stator iron core 10 by the bolts 58 which extend through the stator iron core 10. The ring 56 extends around the entire circumference of the stator iron core 10 and may be constructed of a suitable material, such as steel. A plurality of spacers or spacing blocks 60 are positioned in notches on the inside surface of the ring 56 and are attached to the ring 56 by an arrangement which permits movement of the blocks 60 with the respect to the ring 56, such as by the jack screw 62. A suitable material which has a low coefficient of friction, such as Teflon, may be disposed between the blocks 60 and the member 46 to promote relative axial movement between these members.

The ring 56 and the blocks 60 restrict the radial movement of the ring 46, and thus restrict the outward radial movement of the end winding conductor assembly. During construction, the various spacer blocks 60 would normally be tightened against the member 46 to prevent any looseness between these members and to prevent any radial movement of the end winding conductor assembly due to mechanical forces developed within the generator. The dimensional changes of the end winding conductor assembly due to thermal changes in the generator tend to move the member 46 away from the stator iron core 10. Since movement in this direction is only limited by the frictional forces provided by the ring 46 and the low coefficient of friction material 64, the arrangement taught by this invention does not appreciably restrain the movement of the bracket 34 when conductors 12 and 14 expand. Thus, the distance between the bracket 34 and the conductors 12 and 14 and the integrity of the combined assembly is maintained throughout the thermal cycling of the generator windings. Thus, a secure winding assembly is maintained throughout the life of the generator and the ability of the generator to withstand overload current forces is considerably enhanced.

The springs 50 may be positioned at other places between the stator iron core 10 and the member 46 to provide the force necessary to maintain the spring loading on the end winding conductor securing assembly. For reasons of accessibility, it may be desirable to locate the resilient means, such as the springs 50, at a different location within the generator.

Since the end winding conductor assembly is relatively heavy and since nearly all of the support therefor described thus far is concentrated near the stator iron core assembly, the exterior end of the end winding conductor assembly is susceptible to deflection downward due to the forces of gravity upon the turbine generator components. Thus, the hanger 70 is attached to the generator frame 72 and to the bracket 34 at substantially the top vertical position of the turbine generator. This helps to support the end winding conductor assembly at its exterior end. The hanger 70 may be constructed of a suitable material, preferably a non-metallic material such as glass reinforced epoxy.

The securing arrangement disclosed herein restricts the movement of the end winding conductor assembly in the radial direction away from the longitudinal axis of the stator winding assembly since the entire end winding conductor assembly is contained within the region defined by the spacers 60 which are adjusted to push against the member 46. However, longitudinal movements of the end winding conductor assembly are permitted due to the relative motion permissible between the member 46 and the blocks 60, thus loosening of the end winding conductor supporting assembly does not occur since the bracket 34 moves with the end winding conductors 12 and 14. The restraint assembly provides the radial support necessary for large load currents without longitudinal restraint during thermal dimensional changes.

Since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

What we claim is:
1. Electromechanical apparatus comprising:
   a stator iron core;
   a winding assembly having end winding conductors extending from the stator iron core, said winding assembly having a longitudinal axis;
   a circular member located around the outside of the end winding conductors;
   a plurality of conductor securing brackets attached to said circular member;
   means for securing the end winding conductors to the securing brackets;
   resilient means for forcing the circular member in a longitudinal direction away from the stator iron core; and bracing means for limiting the radial movement of the circular member away from said axis and permitting the longitudinal movement of the ring along said axis, said bracing means being coupled to the stator iron core.

2. The electromechanical apparatus of claim 1 wherein the resilient means comprises compressed springs located between the circular member and the stator iron core.

3. The electromechanical apparatus of claim 1 wherein the bracing means comprises a plurality of circumferentially spaced blocks located around the outside of and positioned against the circular member, and means for preventing motion of said blocks with respect to the stator iron core.

4. The electromechanical apparatus of claim 3 wherein the blocks are attached by a jack screw to a ring which is fastened to the stator iron core.

5. The electromechanical apparatus of claim 3 wherein a material having a relatively low coefficient of friction is disposed between the blocks and the circular member.

6. The electromechanical apparatus of claim 1 including a hanger which supports the end portion of the end winding conductor assembly from the machine enclosure.

7. A turbine generator comprising:
   a stator iron core;
   a winding assembly having end winding conductors extending from the stator iron core, said winding assembly having a longitudinal axis;
   a ring attached to the stator iron core and extending around the winding axis;
   a plurality of circumferentially spaced blocks connected to the ring by a jack screw for moving the blocks in a radial direction with respect to said axis;
   a ring-shaped member positioned around the end winding conductors and against said blocks;
   a plurality of securing brackets circumferentially spaced and attached to the ring-shaped member and to the end winding conductors; and
   resilient means for forcing the ring shaped member in a longitudinal direction away from the stator iron core.

\* \* \* \* \*